US010545770B2

(12) United States Patent
Chew et al.

(10) Patent No.: US 10,545,770 B2
(45) Date of Patent: Jan. 28, 2020

(54) CONFIGURABLE CLIENT HARDWARE

(71) Applicant: Intel Corporation, Santa Clara, CA (US)

(72) Inventors: Yen Hsiang Chew, Bayan Lepas (MY); Eng Choon Tan, Gelugor (MY)

(73) Assignee: Intel Corporation, Santa Clara, CA (US)

(*) Notice: Subject to any disclaimer, the term of this patent is extended or adjusted under 35 U.S.C. 154(b) by 243 days.

(21) Appl. No.: 15/582,041

(22) Filed: Apr. 28, 2017

(65) Prior Publication Data

US 2018/0136943 A1 May 17, 2018

Related U.S. Application Data

(60) Provisional application No. 62/421,828, filed on Nov. 14, 2016, provisional application No. 62/421,856, filed on Nov. 14, 2016, provisional application No. 62/421,843, filed on Nov. 14, 2016.

(51) Int. Cl.
G06F 9/4401 (2018.01)
G06F 13/40 (2006.01)
G06F 1/24 (2006.01)
H04L 9/32 (2006.01)
G06F 13/42 (2006.01)
G06F 9/445 (2018.01)

(52) U.S. Cl.
CPC .............. G06F 9/4411 (2013.01); G06F 1/24 (2013.01); G06F 9/44505 (2013.01); G06F 13/4081 (2013.01); G06F 13/4282 (2013.01); H04L 9/3247 (2013.01); H04L 9/3265 (2013.01); G06F 2213/0026 (2013.01)

(58) Field of Classification Search
None
See application file for complete search history.

(56) References Cited

U.S. PATENT DOCUMENTS

| 5,793,987 A | 8/1998 | Quackenbush et al. |
| 6,012,103 A * | 1/2000 | Sartore .................. G06F 13/10 710/8 |
| 6,609,199 B1 * | 8/2003 | DeTreville ............ G06F 9/4406 713/156 |
| 6,665,766 B1 | 12/2003 | Guccione et al. |
| 7,895,376 B2 | 2/2011 | Boecker et al. |
| 9,361,120 B2 | 6/2016 | Cao et al. |

(Continued)

OTHER PUBLICATIONS

Poritz et al., "Property Attestation-Scalable and Privacy-friendly Security Assessment of Peer Computers", Research Report, IBM, May 10, 2004 (Year: 2004).*

Primary Examiner — James R Marandi
(74) Attorney, Agent, or Firm — Schwegman Lundberg & Woessner, P.A.

(57) ABSTRACT

Various systems and methods for configuring a pluggable computing device are described herein. A pluggable computing device may be configured to be compatible with a pluggable host system using a default communication channel to obtain configuration settings and configure a programmable logic device on the pluggable computing device. The pluggable computing device may perform chain of trust processing on the pluggable host system. The pluggable computing device may be disposed on a compute card, which may include a heat sink in a particular configuration.

12 Claims, 12 Drawing Sheets

(56) References Cited

U.S. PATENT DOCUMENTS

| | | |
|---|---|---|
| 2002/0087877 A1 | 7/2002 | Grawrock |
| 2006/0101307 A1* | 5/2006 | Rapp .................. G06F 9/54 |
| | | 714/13 |
| 2007/0101138 A1 | 5/2007 | Camenisch |
| 2008/0320308 A1 | 12/2008 | Kostiainen et al. |
| 2011/0099627 A1* | 4/2011 | Proudler .............. G06F 21/57 |
| | | 726/21 |
| 2014/0289826 A1* | 9/2014 | Croome ............... H04L 67/141 |
| | | 726/5 |
| 2014/0380019 A1* | 12/2014 | Wilkerson ........... G06F 9/3836 |
| | | 712/30 |
| 2015/0081928 A1* | 3/2015 | Wintzell .............. G06F 9/4411 |
| | | 710/8 |

* cited by examiner

CONFIGURABLE CLIENT HARDWARE

CLAIM OF PRIORITY

This patent application claims the benefit of priority U.S. Provisional Patent Application Ser. No. 62/421,828, entitled "Configurable Client Hardware," filed on Nov. 14, 2016, U.S. Provisional Patent Application Ser. No. 62/421,843, entitled "Composite Chain Of Trust Measurement For Huggable Host Computing Architecture," filed on Nov. 14, 2016, and U.S. Provisional Patent Application Ser. No. 62/421,856, entitled "Low Profile Heat sink for Compute Module," filed on Nov. 21, 2016, all of which are hereby incorporated by reference herein in their entireties.

TECHNICAL FIELD

Embodiments described herein generally relate to hardware interfaces and in particular, to configurable client hardware and related devices.

BACKGROUND

An application-specific integrated circuit (ASIC) is an integrated circuit (IC) that is customized for a particular use rather than a general purpose use. Some ASICs are reconfigurable or reprogrammable. Such ASICs may be referred to as field-programmable gate arrays (FPGAs).

ASICs and other integrated circuits may be installed on pluggable systems. Huggable systems may have root of trust components, such as a BIOS or boot firmware. A chain of trust may be established by validating each component of hardware or software from the bottom up. A kernel of trust, which may be encapsulated in the boot software of a computing device, for example, may be used to grow a chain of trust outward.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
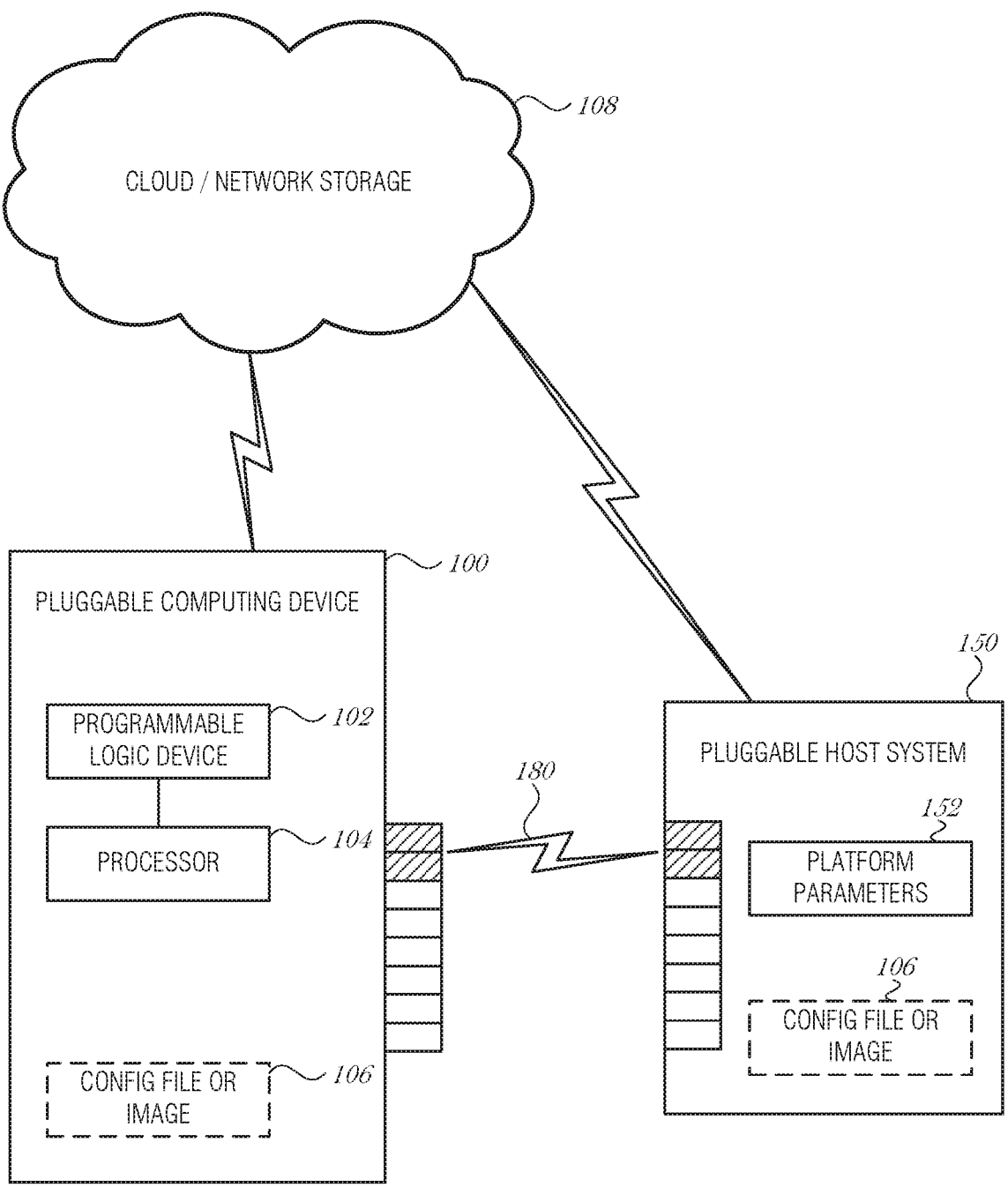
FIG. 1 is a block diagram illustrating an operating environment, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Configurable Pluggable Computing Device

A host pluggable computing system is made up of two distinct components, namely a pluggable computing device (e.g., a pluggable computing device designed using Intel's Open Huggable Specification, or using Intel's Integrated Module Architecture specification) and a host system (e.g., a pluggable display panel, a smart projector with a pluggable computing interface, etc.). Pluggable computing devices with an application-specific integrated circuit (ASIC) may reconfigure subsets of its physical input/output (I/O) pins to match the interconnect I/O types and pin mapping of its pluggable host system. However there is a limitation to the configurability of an ASIC module's I/O pins. For example: subsets of I/O pins of a processor or chipset may be configured to implement any one of a PCIE, a USB, or a SATA bus I/O configuration because all the three bus controllers (e.g., PCIE, USB, and SATA) of the processor or chipset are physically multiplexed onto the same sets of I/O pins. However these set of I/O pins cannot be configured to implement other types of I/O such as serial, Ethernet, display (e.g., HDMI, DP), or GPIO.

A pluggable computing device may be paired with any host system (e.g., a pluggable display, a smart projector, a kiosk, a robot, a car, a drone). Different host systems may have different I/O requirements and pin mappings, as such a pluggable computing device may need greater flexibility to reconfigure its interconnect I/O types and pin mappings in order to support a larger number of host systems. In addition, some pluggable host systems may optimize their performance with the help of custom designed hardware accelerators (e.g., a cryptographic accelerator for data encryption or decryption, a network packet processing hardware accelerator, a video encode or decode hardware accelerator, or the like). If the needed hardware accelerators are not available in the processor or chipset of the host pluggable device, then the functionally of these hardware accelerators may need to be emulated using software which may significantly impact the performance of its host system.

The present disclosure describes systems and methods to dynamically reconfigure a programmable logic device (e.g., an FPGA, CPLD, or the like) on a pluggable computing device when the device is plugged into a host system in order to provide greater flexibility for the host pluggable device to meet the host system's interconnect I/O types and pin mappings requirements, and to provide the needed hardware accelerators to the host system in order to optimize the performance of the composite pluggable computing system (host pluggable device plus its plugged host system).

The system provides original equipment manufacturer (OEM) defined platform configurations or a pointer to a programmable logic device configuration image is stored in a host system (e.g., in a flash or EEPROM memory device of a pluggable display panel). When a pluggable computing device with a programmable logic device (e.g., an FPGA) is plugged into a host system, the processor on the pluggable computing device will read and use the platform configurations or the programmable logic device configuration image to configure its on-board programmable logic device to meet the I/O types and pin mappings of its plugged host system. In addition, programmable logic device may also be configured to implement some customer designed hardware accelerator logic in its programmable logic device.

Several advantages include greater flexibility for a pluggable computing device to configure its interconnect I/O types and pin mappings in order to support a larger number of host systems with different IO requirements. Additionally, the systems and methods described herein enable a pluggable computing device to identify and implement the right sets of hardware accelerators when the host pluggable device is plugged into a host system. The correct set of hardware accelerators may be dynamically identified and implemented on the host pluggable, device's onboard programmable logic device after the two systems are plugged together. Doing so enables the composite pluggable computing system (pluggable computing device plus its host system) to optimize its overall system performance and I/O compatibility.

FIG. 1 is a block diagram illustrating an operating environment, according to an embodiment. A pluggable computing device 100 includes a programmable logic device 102 coupled to a processor 104. The programmable logic device 102 may be a FPGA, CPLD (complex programmable logic device), or other IC capable of being programmed.

A pluggable host system 150 includes platform parameters 152. The platform parameters 152 may include information such as supported I/O types, I/O pin mappings, desired hardware accelerator functions, a pointer to a programmable logic device configuration file or image, or any other OEM defined information that will assist a pluggable computing device 100 to better identify the pluggable host system 150. The platform parameters 152 may be stored in a flash or EEPROM memory device, for example.

When the pluggable computing device 100 is plugged into the pluggable host system 150, the processor 104 accesses the platform parameters 152 via a handshake communication channel 180. The communication channel 180 may be preconfigured based on a pre-determined protocol. In the example illustrated in FIG. 1, the handshake communication channel 180 includes the two pins indicated with shading. The pluggable computing device 100 obtains the platform parameters 152 from the pluggable host system 150 and then determines how to configure its onboard programmable logic device 102 in order to be compatible with the pluggable host system's I/O types, I/O pin mapping, and hardware accelerator functions.

The pluggable computing device 100 may inspect the platform parameters 152, obtain a configuration file or image 106 by referencing the platform parameters 152, and configure the programmable logic device 102 using the configuration file or image 106.

Configuring the programmable logic device 102 may include operations like configuring the I/O pins of the programmable logic device 102 to match the I/O types and pin mappings of the pluggable computing device 100 to the pluggable host system 150. The programmable logic device 102 may also configure subsets of programmable logic gates of the programmable logic device 102 to perform hardware acceleration functions based on the platform parameters 152. Additionally, the programmable logic device 102 may load a configuration file or image 106 from a storage location referenced by the platform parameters 152. In this way, the platform parameters may store a limited amount of data, such as the location of the configuration file or image 106, and then the programmable logic device 102 may use the configuration file or image 106 to configure or reconfigure the programmable logic device 102. The configuration file or image 106 may be stored in one or more locations, such as a storage device on the pluggable host system 150 (e.g., a ROM or flash device), a storage device on pluggable computing device 100 (e.g., a flash device or a hard drive partition), or a network storage location 108 accessible by either the pluggable computing device 100 or the pluggable host system 150.

After the programmable logic device 102 is configured to implement the I/O between the pluggable host system 150 and its pluggable computing device 100, as well as the hardware accelerator functions, the composite pluggable computing system (e.g., the combination of the pluggable computing device 100 and the pluggable host system 150) may function as normal.

Figure 2:
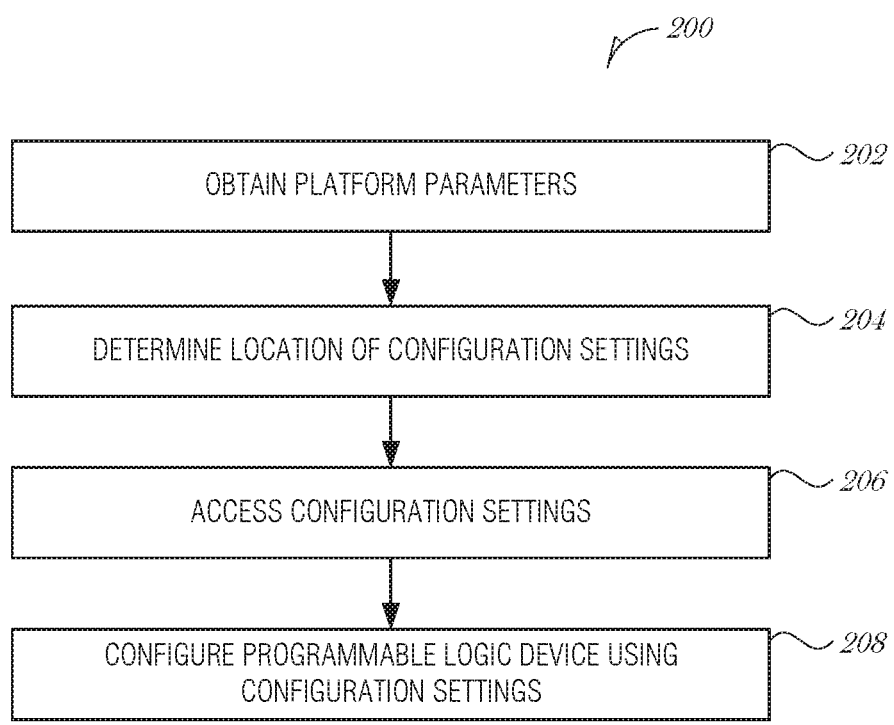
FIG. 2 is a flowchart illustrating a method for configuring a pluggable computing device, according to an embodiment.

FIG. 2 is a flowchart illustrating a method 200 for configuring a pluggable computing device to be compatible with a pluggable host system, according to an embodiment. At block 202, a default communication channel is used to obtain a set of platform parameters from the pluggable host system, when the pluggable computer device is plugged into the pluggable host system.

At block 204, a location of a set of configuration settings is determined from the platform parameters. In an embodiment, the location of the set of configuration settings is a memory device in the pluggable host system. In a related embodiment, the location of the set of configuration settings is a memory device in the pluggable computing device. In a related embodiment, the location of the set of configuration settings is a networked storage device. The location of the set of configuration settings may be in the platform parameters, in an embodiment. The location may be a file path, a uniform resource locator (URL), a memory address, or the like. The location may be encrypted, signed, or otherwise secured.

At block 206, the set of configuration settings is accessed from the location. At block 208, a programmable logic device is configured using the configuration settings, the programmable logic device integrated into the pluggable computing device.

In an embodiment, configuring the programmable logic device comprises configuring input/output pins of the programmable logic device to match input/output types and pin mappings of the pluggable computer device with the input/output types and pin mappings of the pluggable host system. Various types of I/O may be implemented, such as serial I/O, Ethernet, USB, PCI Express, SATA, display (e.g., HDMI, display port, etc.), or GPIO.

In an embodiment, configuring the programmable logic device comprises configuring subsets of programmable logic gates of the programmable logic device to perform a hardware acceleration function. The programmable logic device may be one of a number of types of devices, such as a FPGA, CPLD, or the like.

Composite Pluggable Computing System Chain of Trust Measurement

Conventionally, a computing system's root of trust components (e.g., BIOS, boot firmware, OS components, platform configurations, or the like) may be sealed by its manufacturer or OEM by signing these root of trust components with the manufacturer's secret key and storing the signature in a sealed storage of a security co-processor or a trusted platform management (TPM) module. During system boot-up or a remote attestation request, the TPM may sequentially verify the signature of each of the root of trust components in the computing system's chain of trust before the verified components are allowed to be executed by the processor. When the two components of a pluggable system are plugged into each other to form a composite computing system, this composite computing system may contain root of trust components (e.g., platform configurations) from both the pluggable computing device and the pluggable host system.

It may not be possible for a pluggable computing device OEM (e.g., OEM A) to know in advanced the host system to which the pluggable computing system will be paired (e.g., pluggable computing device from OEM A may be plugged into a digital signage display from OEM B, or may be plugged into a smart projector from OEM C); hence it may not be possible for OEM A to effectively provision its pluggable computing device's chain of trust to include the platform configurations of components of its "unknown" host system.

The systems and methods described herein provide a mechanism to establish the chain of trust of a composite pluggable computing system when a pluggable computing device is plugged into a host system. In this environment, the composite chain of trust of this composite computing system contains root of trust elements from both the pluggable computing device and its host system.

In general, the system includes an OEM-defined set of configuration parameters stored in a host system (e.g., in a flash or EEPROM memory device of a pluggable display panel). These configuration parameters are signed by the OEM using the OEM's secret key and its signature is stored together with the configuration parameters. When a pluggable computing device is plugged into the host system, the pluggable computing device reads the configuration parameters from the host system and performs a first measured verification process on the host system configuration parameters to ensure that the computed signature of the configuration parameters matches its stored signature. If the first measured verification process is successful, then pluggable computing device stores the host system configuration parameters in a non-volatile storage and performs a second measured verification process on its own chain of trust (e.g., performs a secure boot). During the second measured verification process (e.g., secure boot measurement process), the pluggable computing device may use the configuration parameters from host system to configure its pluggable I/O interface in order to optimize I/O compatibility between the pluggable computing device and the host system. In some embodiments, overall system performance and thermal design power (TDP) of the composite computing system may also be optimized. When a remote attestation request is received, the pluggable computing device may include both the platform parameters from the host system and its own chain of trust components in the computation of a composite attestation result.

The present security mechanisms include advantages, including but not limited to enabling a secure boot chain of trust measurement or remote attestation measurement to be performed on a composite host pluggable computing system (pluggable computing device plus its host system) in order to protect the overall integrity of the system. For instance, a pluggable computing device may be sold to many different customers and plugged into many different host systems (e.g., signage displays, kiosks, projectors, vehicles, robots, drones, etc.). As such, it is not possible for the pluggable computing device OEM to provision the device's chain of trust to include platform parameters of a host system without first knowing which host system the pluggable computing device will be plugged into. The present system and methods address this problem.

Further, the present mechanisms enable a pluggable computing device's chain of trust measurement to scale to include any host system that conforms to an embodiment of this invention. A pluggable computing device designed using this mechanism is secure irrespective of which host system it is eventually plugged into.

Further, the present mechanisms enhance the overall security of a composite host pluggable computing system. In conventional systems, secure boot and remote attestation perform a chain of trust measurement only on a pluggable computing device—not on the composite system (pluggable device and host). As such, if the platform parameters of a companion host system are compromised, then the integrity of the entire composite host pluggable computing system may be compromised. For example, a hacker may tamper with the platform parameters of a smart car host system to indicate to a remote navigation software service provider that it is a drone and is capable of flight. This may cause the remote navigation software service provider to load the wrong navigation control software update to the smart car which may result in undesirable consequences. In this example, a chain of trust mechanism on the pluggable computing device alone is not sufficient to detect that the host system has been compromised. The present disclosure protects against such an attack or mistake.

Figure 3:
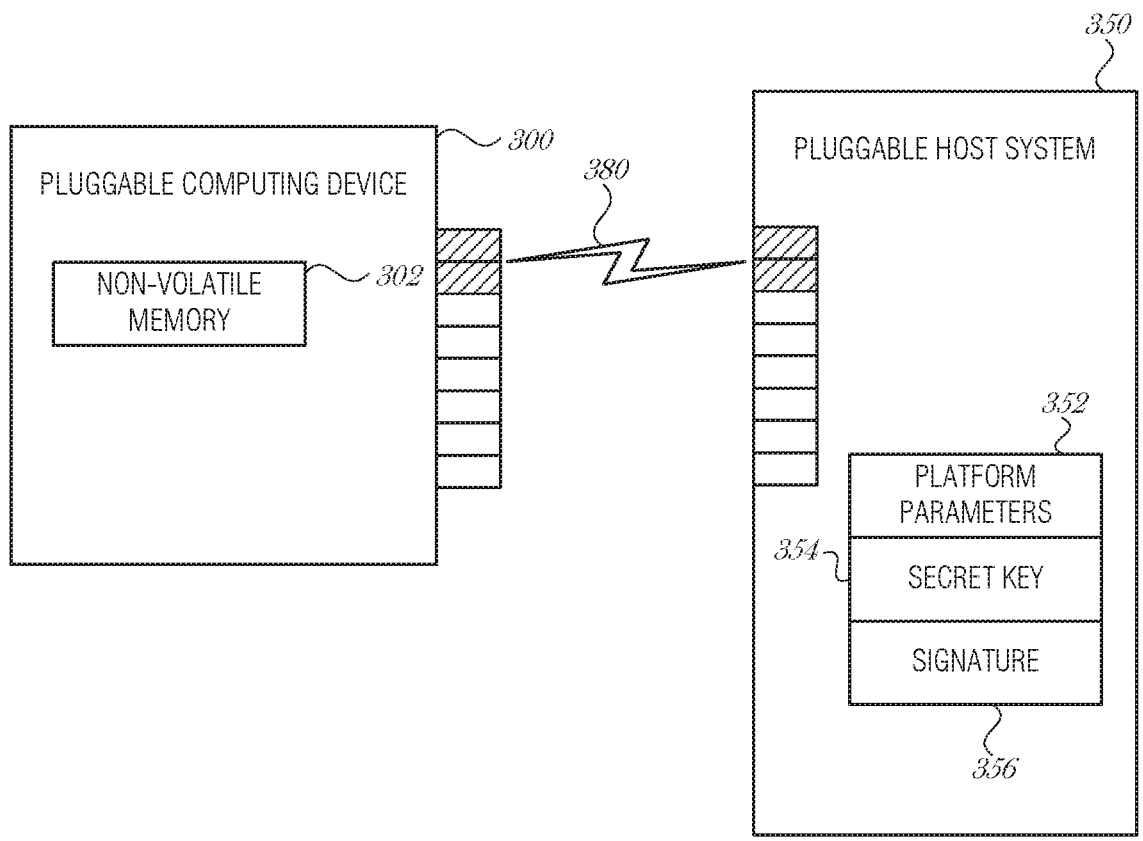
FIG. 3 is a block diagram illustrating an operating environment, according to an embodiment.

FIG. 3 is a block diagram illustrating an operating environment, according to an embodiment. A pluggable computing device 300 includes a non-volatile memory 302. A pluggable host system 350 includes platform parameters 352. The platform parameters 352 may include information such as supported I/O types, I/O pin mappings, desired hardware accelerator functions, host platform TDP, a pointer to a programmable logic device configuration file or image, or any other OEM defined information that assists a pluggable computing device 300 to identify the pluggable host system 350. The platform parameters 352 may be stored in a flash or EEPROM memory device, for example.

The platform parameters 352 are signed by its OEM using an OEM secret key 354. An OEM signature 356 is stored with the platform parameters 352. The OEM secret key 354 contains the OEM public code verification key for the pluggable host system 350.

In an example, the OEM-defined set of platform parameters are stored in the pluggable host system 350 (e.g., in a flash or EEPROM memory device of a pluggable display panel). Platform parameters 352 (e.g., configuration parameters) may include a combination of host system information such as: I/O mappings, TDP and performance requirements, a functional description of the host system (e.g., signage, car, robot, etc.), a list of available sensors coupled to the host system, or any other OEM-defined information that will assist a host pluggable computing system to better identify the host system. An OEM furnished secret key 354 signed by a trusted certificate authority that contains OEM information (e.g., company name, product info, etc.) and a public code verification key of the OEM is stored with the parameters 352. Both the parameters 352 and the secret key 354 are signed by the OEM using the OEM's secret key 354, and its signature 356 is stored together with the parameters 352 and secret key 354. In an embodiment, only the parameters 352 are signed by the OEM's secret key 354.

When the pluggable computing device 300 is plugged into the host system 350, TPM or boot firmware of the pluggable computing device 300 initiates a secure measured boot process to validate a chain of trust that contains root of trust elements from both the pluggable computing device 300 and the associated pluggable host system 350. Operations include, but are not limited to: TPM or boot firmware reads the configuration parameters 352, signature 356 and secret key 354 from the pluggable host system 350 through a communication channel 380 (e.g., SPI, I2C, etc.). The pluggable computing device 300 verifies the authenticity of the OEM furnished secret key 354 (e.g., through a public key infrastructure (PKI); or by using a pre-provisioned public key of the trusted certificate authority pre-stored in a sealed storage of the TPM). The pluggable computing device 300 uses the public code verification key of the OEM certificate to perform a measured validation of the platform parameters and certificate to ensure that they have not been tempered with. Upon successful validation of platform parameters 352, the platform parameters 352 are stored in a non-volatile memory 302 of the pluggable computing device 300 while the signature 356 and OEM furnished secret key 354 may be stored in a secure storage of the TPM for future use. Subsequently, the pluggable computing device 300 may utilize the verified platform parameters to reconfigure itself (through a measured secure boot process) to optimize overall I/O compatibility, performance and TDP of the composite host pluggable system (e.g., the pluggable computing device 300 and the pluggable host system 350 in combination). Reconfiguration may be performed as described in FIGS. 1-2.

In some embodiments, a reset or reboot of the pluggable computing device 300 may be invoked to properly configure the composite host pluggable system. In some embodiments, during the secure boot and self-reconfiguration process of the pluggable computing device 300, the platform parameters 352 may be included as a root of trust element in the chain of trust measurement (e.g., measured boot process of the pluggable computing device will perform a cryptographic measurement of the host system platform parameters as part of the chain of trust establishment).

When a remote software or service provider requests a composite pluggable computing system (e.g., combination of pluggable computing device 300 and pluggable host system 350) for remote attestation, the pluggable computing device 300 may include the platform parameters 352 of the pluggable host system 350 in its cryptographic chain of trust measurement in order to produce a composite attestation result.

Figure 4:
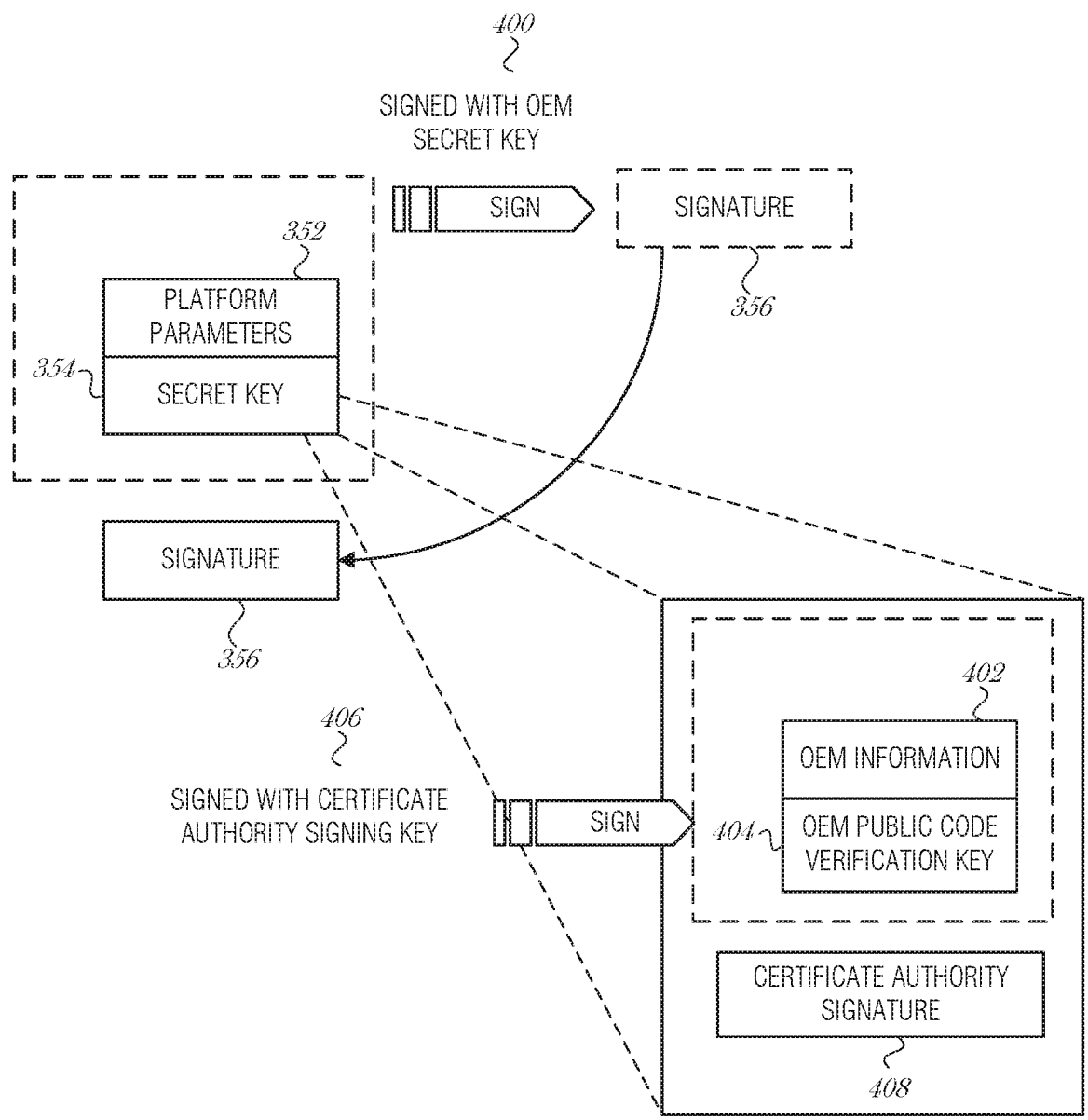
FIG. 4 is a schematic diagram illustrating the construction and arrangement of the platform parameters and OEM certificate, according to an embodiment.

FIG. 4 is a schematic diagram illustrating the construction and arrangement of the platform parameters 352 and OEM secret key 354, according to an embodiment. The platform parameters 352 and OEM secret key 354 are packaged together and signed with OEM secret key 400. The resulting signature 356 is stored at the pluggable host system 350 along with the platform parameters 352 and OEM secret key 354, as described above in FIG. 3. The OEM secret key 354 includes OEM information 402 and OEM public code verification key 404, which are packaged together and signed with a certificate authority signing key 406. A certificate authority signature 408 is also stored in the OEM secret key 354.

Figure 5:
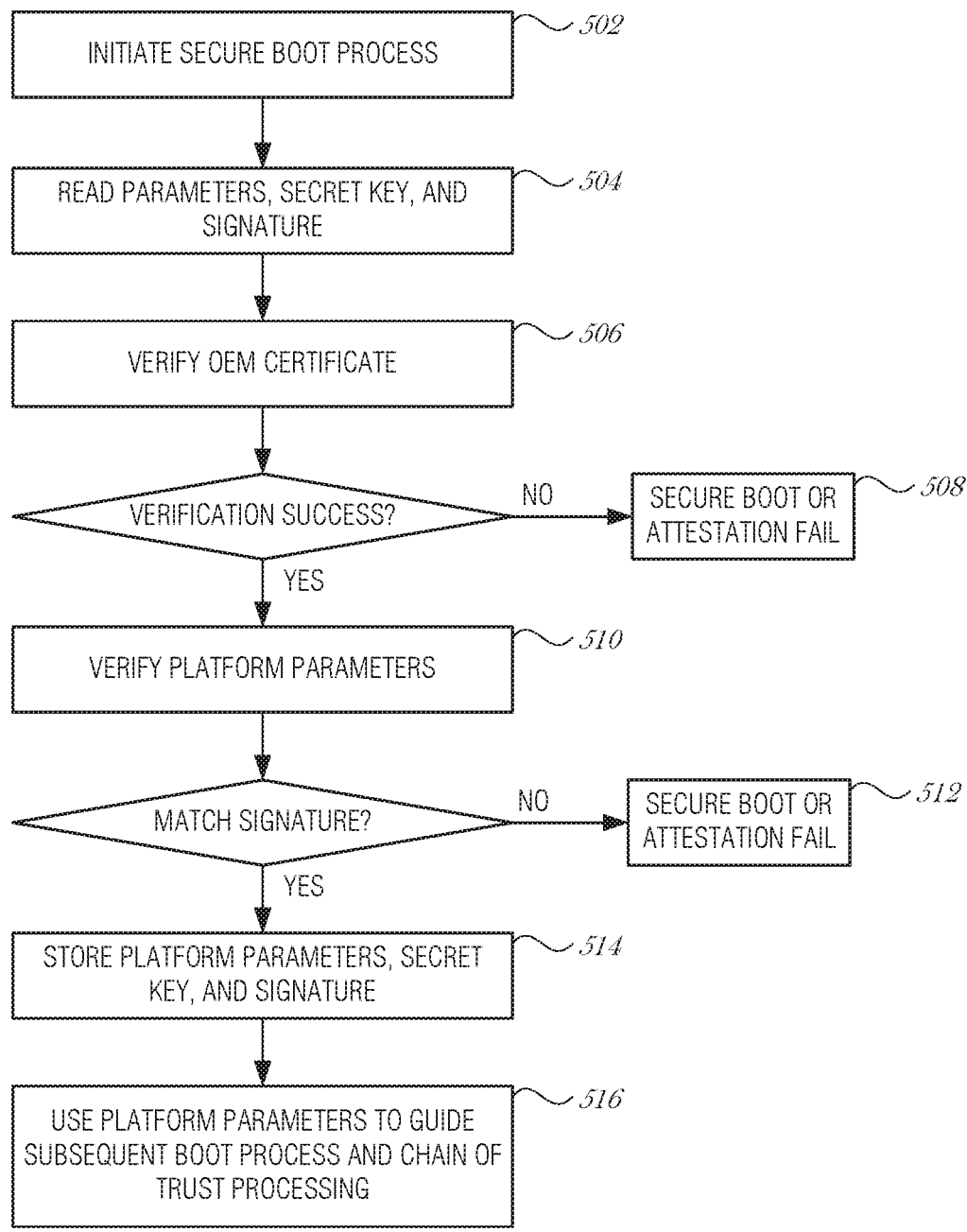
FIG. 5 is a flowchart illustrating a method for implementing a chain of trust for a composite pluggable system, according to an embodiment.

FIG. 5 is a flowchart illustrating a method 500 for implementing a chain of trust for a composite pluggable system, according to an embodiment. At block 502, a secure hoot process is initiated. This may be in response to the pluggable computing device 500 being powered on, being reset, or upon receipt of a remote attestation request, for example. At block 504, the platform parameters 352, OEM secret key 354, and signature 356 are read from the pluggable host system 350. The OEM secret key 354 is verified for authenticity (operation 506). If the verification is unsuccessful, then the secure hoot or attestation fails at operation 508.

If the verification is successful, then the OEM public code verification key 404 from the OEM secret key 354 is used to verify the platform parameters 352 (operation 510). This may be performed through a public key infrastructure (PKI) or by using a pre-provisioned public key of the trusted certificate authority that is stored in a predetermined location, such as a sealed storage located in the trusted platform management (TPM) module. If the measurement does not match the signature 356, then the secure hoot or attestation fails at operation 512.

If the measurement does match the signature 356, then the platform parameters 352 are stored in the non-volatile memory 302 of the pluggable computing device 300, and the OEM secret key 354 and signature 356 are stored in TPM secure storage of the pluggable computing device 300 (operation 514). At operation 516, the validated platform parameters 352 are then used to guide a subsequent boot process, which performs cryptographic measurements on subsequent blocks in the root of trust chain until boot completion or until the entire root of trust chain is traversed for remote attestation.

The pluggable computing device 300 may additionally utilize verified platform parameters 352 to reconfigure itself, for example, to optimize overall I/O compatibility, performance, or TDP of the composite host pluggable system. Reconfiguration may be performed as described above in FIGS. 1-2.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 6:
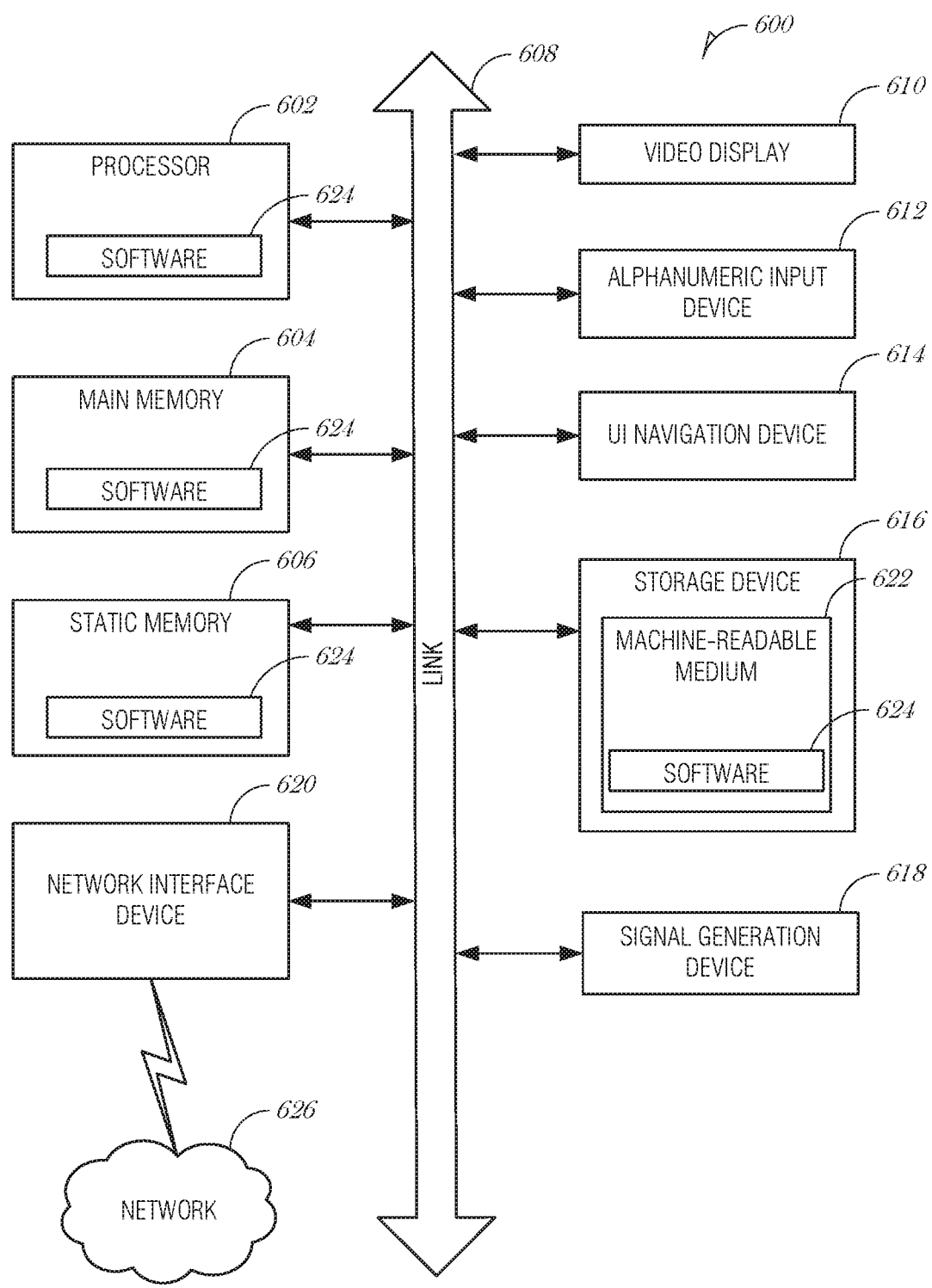
FIG. 6 is a block diagram illustrating an example machine upon which any one or more of the techniques (e.g., methodologies) discussed herein may perform, according to an example embodiment.
Figure 7:
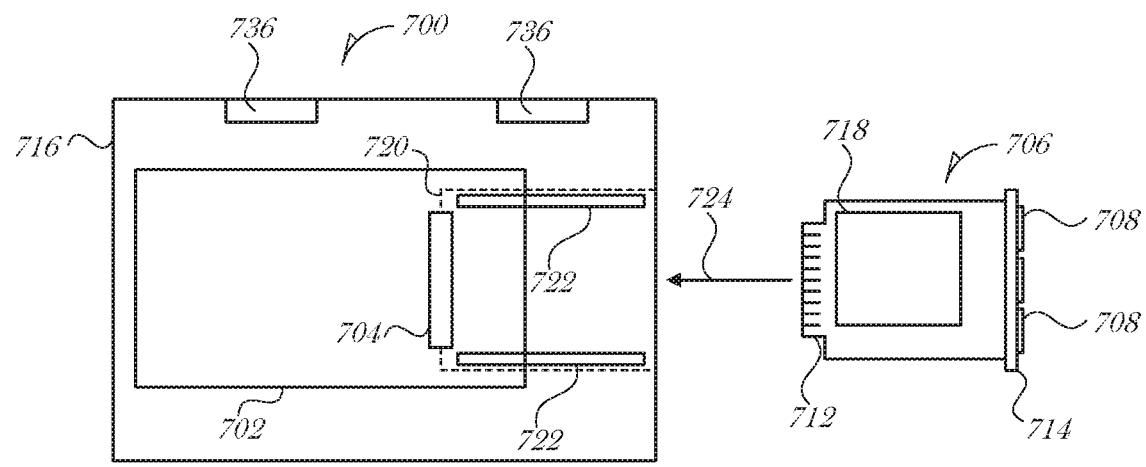
FIG. 7 is a schematic diagram of a host system, according to an embodiment.
Figure 8:
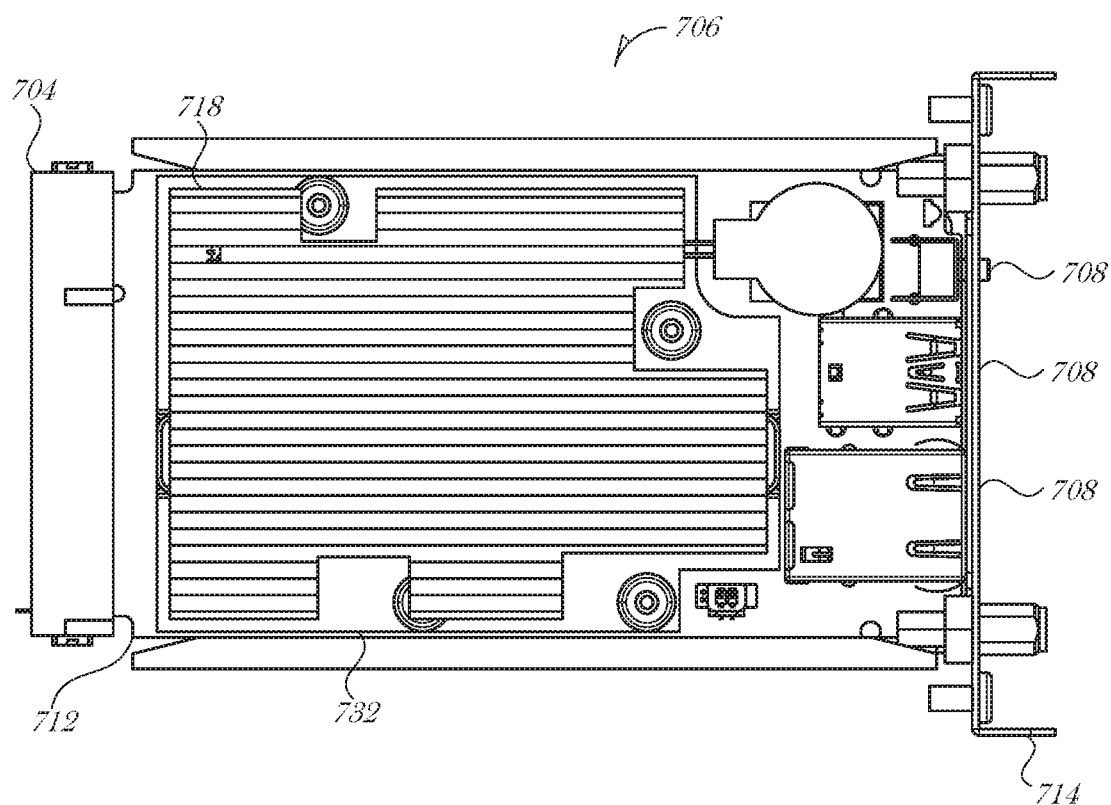
FIG. 8 is a top view of a compute card, according to an embodiment.
Figure 9:
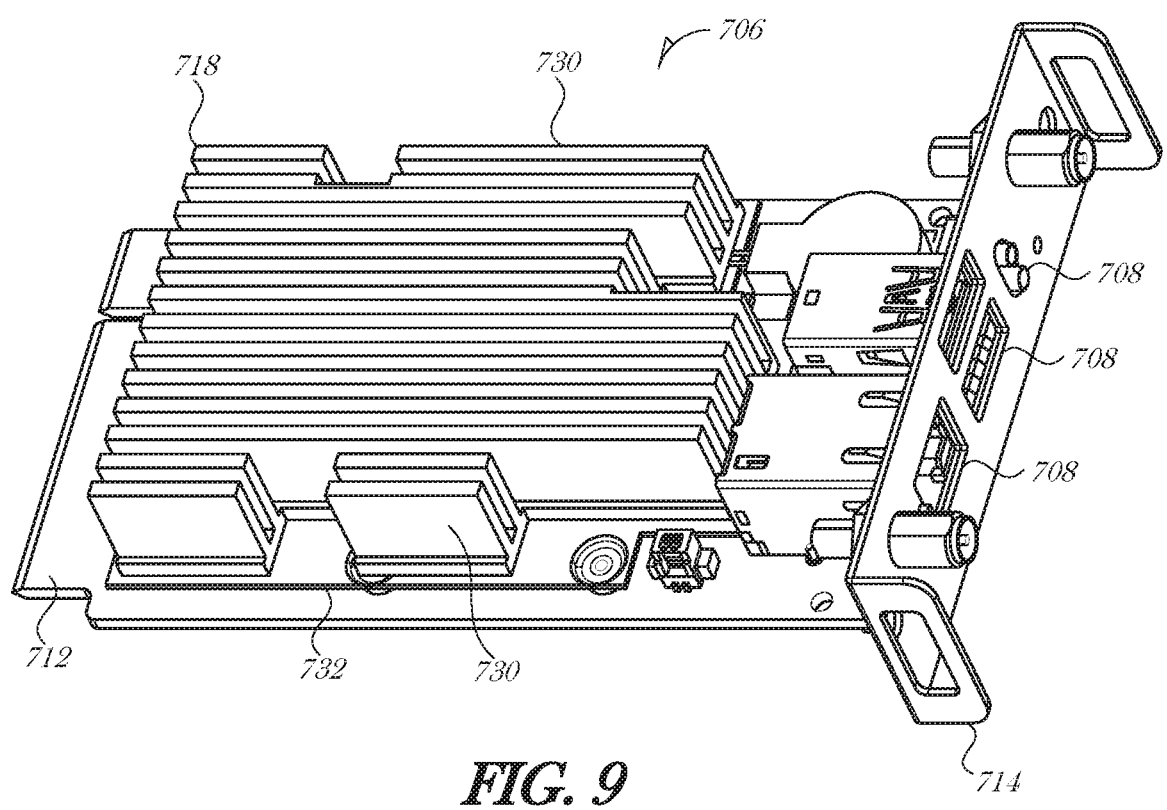
FIG. 9 is a perspective view of a compute card, according to an embodiment.
Figure 10:
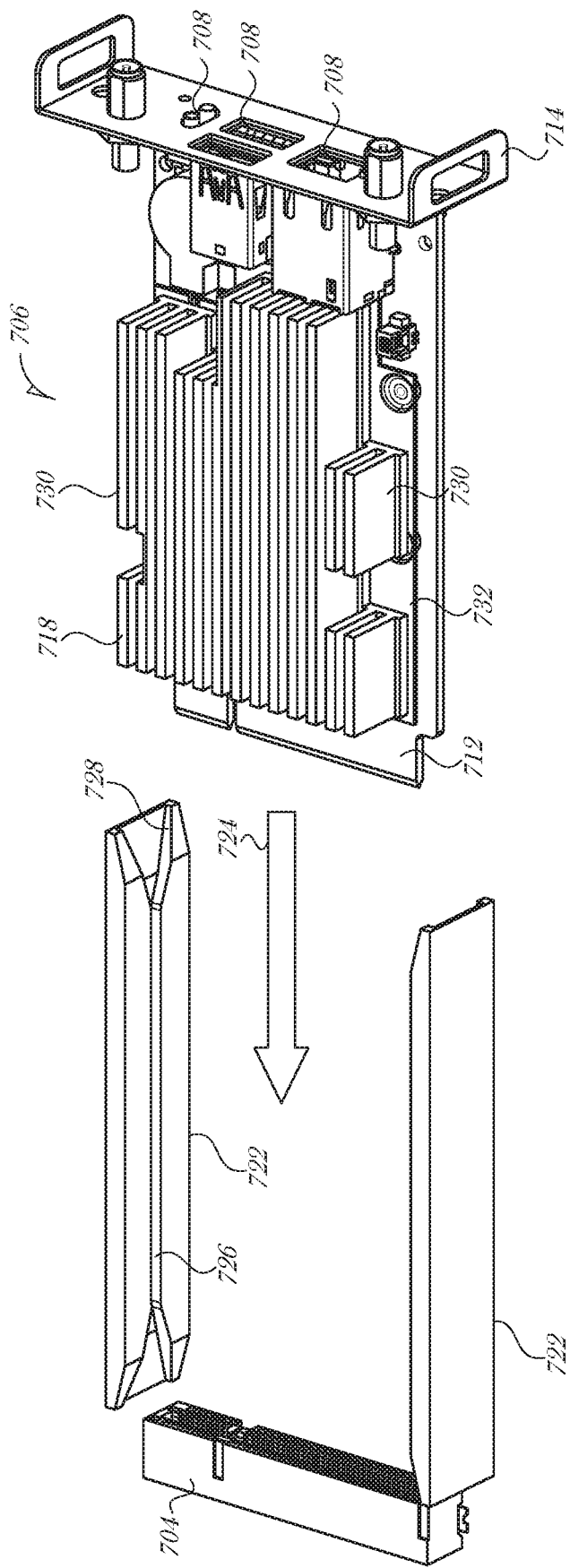
FIG. 10 is a schematic perspective view illustrating insertion of the compute card depicted in FIG. 8 into a receptacle of a host system, according to an embodiment.
Figure 11A:
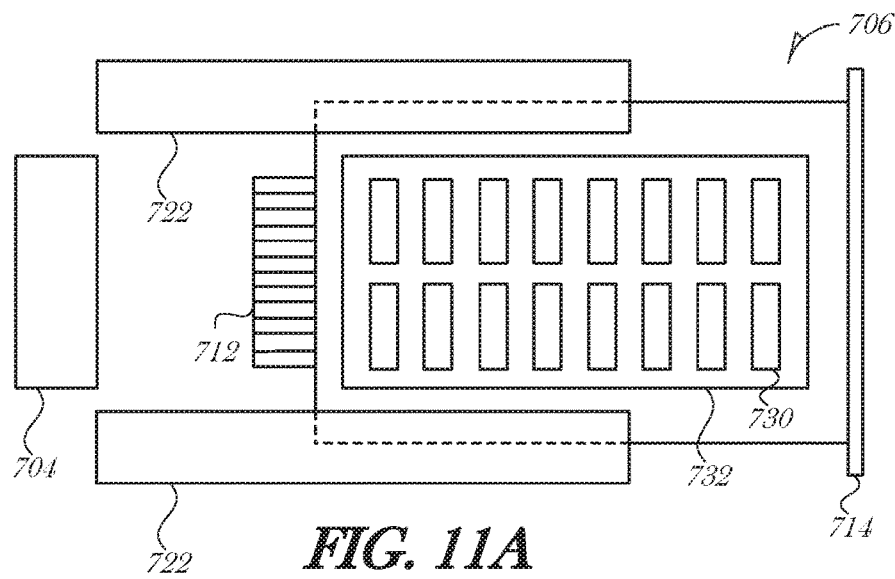
FIG. 11A is a schematic top view illustrating insertion of a compute card depicted in FIG. 8 into a receptacle of a host system, according to an embodiment.
Figure 11B:
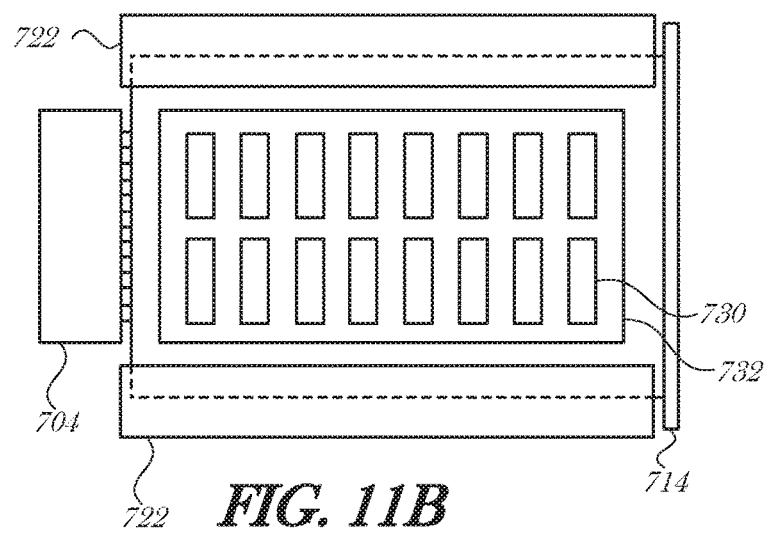
FIG. 11B is a schematic top view illustrating the compute card depicted in FIG. 11A received in the receptacle of the host system, according to an embodiment.
Figure 11C:
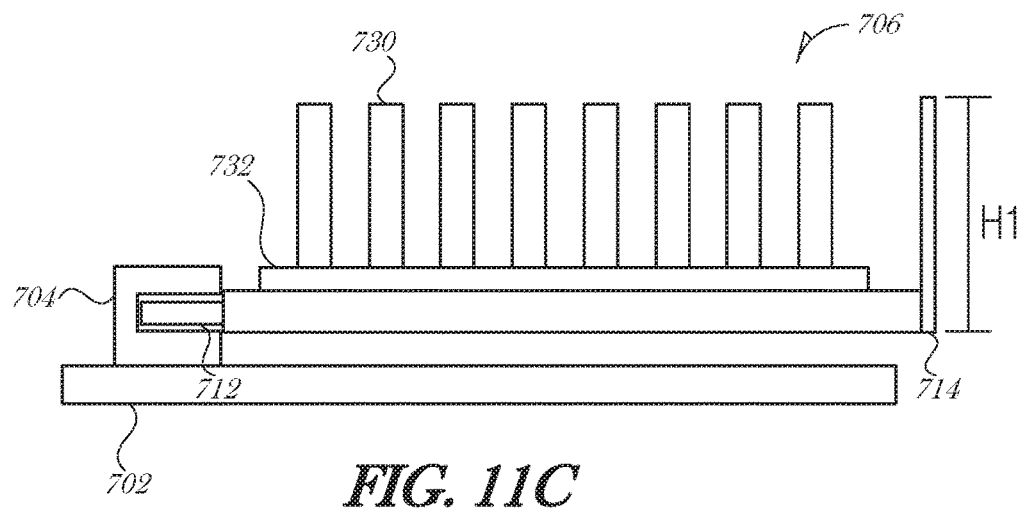
FIG. 11C is a schematic side view illustrating the compute card depicted in FIG. 11A received in the receptacle of the host system, according to an embodiment.

FIG. 6 is a block diagram illustrating a machine in the example form of a computer system 600, within which a set or sequence of instructions may be executed to cause the machine to perform any one or more of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a pluggable device, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a processor subsystem, a central processing unit (CPU), a graphics processing unit (CPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Heat Sink for Pluggable Computing Devices

Pluggable computing devices may be plugged into a receptacle on the external housing of a pluggable host system. Alternatively, a pluggable computing device may be plugged into an internal receptacle of the pluggable host system. The receptacle may be referred to as a port, slot, plug, or jack in various examples. For instance, a PO slot on a motherboard is one example of an internal receptacle of a pluggable host system.

When a pluggable computing device or other type of compute card is inserted into an internal receptacle, the interior dimensions of the host system may restrict or inhibit the size of the compute card and its components. The host system may be an all-in-one (AIO)) system. Design factors that are used to create attractive AIO systems (e.g., thin, lightweight, etc.) may also reduce the amount of space for internal components. As such, one problem to be solved is providing sufficient heat dissipation for compute cards installed within a host system.

In an example, the present subject matter addresses this problem, such as by providing a compute card having an integrated heat sink. The heat sink may include a plurality of fins positioned on a primary fin plate and at least one secondary fin plate conductively connected to the primary fin plate. The primary fin plate and the secondary fin plate may cooperatively define the overall lateral area of the heat sink. The secondary fin plate may be offset laterally from the primary fin plate to increase the overall lateral area of the heat sink. The increased overall lateral area increases the effective surface area of the heat sink through which heat may be dissipated. The plurality of fins may each extend transversely from one of the primary fin plate and the secondary fin plate. The increased overall lateral area may provide space for additional fins on the heat sink. The increased heat dissipation provided by the additional fins and the increased overall lateral area permits shorter fins to be used reducing a total height of the compute card.

The lateral placement of the secondary fin plate is advantageous because it increases overall surface area of its heat dissipating fins without increasing the z-height of the fins. This enables the composite pluggable computing system assembly to have a thinner form factor. Additionally, by using z-space over the receptacle, the pluggable compute card has a larger heat sink to dissipate more heat. Depending on the design of other interior components, the primary or secondary fin plate may extend longitudinally, further increasing heat dissipation capacity.

FIGS. 7-10 are schematic diagrams of a host system 700 and compute card 706, according to an embodiment. A host system 700 may include a motherboard 702 and an interconnect receptacle plug 704 for connecting a compute card 706 to the motherboard 702. The host system 700 may comprise, but is not limited to, a pluggable host system, retail MO host devices or systems such as signage display panels, kiosks, e-whiteboards, smart projectors, and smart vending machines. The compute card 706 may include at least one interface connector 708 for connecting external devices (e.g. displays, speakers, user interface devices) to the motherboard 702 through the compute card 706. The compute card 706 may be disconnected from the interconnect receptacle plug 704 and replaced with a different compute card 706, for example, to replace a faulty compute card 706 or upgrade an obsolete compute card 706 with a new compute card 706 having a higher performance processor or different interface connectors 708. Interface connectors 708 may include one or more of a USB port, an HDMI port, a display port (DP) port, an audio jack, a network jack (e.g., an Ethernet jack), or the like. In an example, the second compute card 706 may include at least one different interface connector 708 such that substituting the second compute card 706 provides different interface connectors 708 to which the external devices may be connected.

The compute card 706 and host system 700 may be considered as a pluggable computing device and a pluggable host system, respectively, and be combined into a composite pluggable computing system, as described above in FIGS. 1-6. Operations of pluggable device configuration and composite chain of trust management and attestation may be used with the compute card 706 and host system 700.

In an example, the host system 700 may include at least one fan 736 for drawing an airflow through the host system 700. The fan 736 may be oriented to draw an airflow across the compute card 706 to cool the heat sink 718 to improve the heat dissipation of the heat sink 718.

The compute card 706 may include a motherboard connector 712 and an I/O panel 714 including at least one interface connector 708. The motherboard connector 712 may comprise a PCI-Express ("PCIe") x8 connector, where the pin definitions are customized for the particular I/O panel 714 configuration and host system 700 application. The motherboard connector 712 may be configured to interface for power and system management signals; display interfaces; I/O expansions such as USB 3.0 and PCI Express; and control and sensor enabling interfaces such as I2C, UART, and SPI. The motherboard connector 712 and the I/O panel 714 may be oriented on the compute card 706 such that the motherboard connector 712 and the I/O panel 714 are positioned opposite each other on the compute card 706. In an example, the I/O panel 714 may interface with an outer housing 716 of the host system 700 when the compute card 706 is connected to the motherboard 702 of the host system 700. For example, the I/O panel 714 may be positioned on a side panel of the outer housing 716 of the host system 700. In this configuration, the I/O panel 714 and the interface connectors 708 thereon may be accessed externally. The outer housing 716 may be shaped to mate with the perimeter boundaries I/O panel 714 when the compute card 706 is connected to the motherboard 702, which may improve the overall aesthetic appearance of the host system 700. In an embodiment, the I/O panel 714 may be omitted from the compute card 706 if no external I/O is needed by the compute card 706 or the motherboard 702. Omitting the I/O panel 714 enables the outer housing 716 to completely conceal the compute card 706 when it is plugged into host system 700.

The host system 700 may define a receptacle 720 for receiving the compute card 706 when the compute card 706 is coupled to the motherboard 702 via the interconnect receptacle plug 704. The interconnect receptacle plug 704 may be a right angled receptacle plug such that the compute card 706 is oriented parallel to the motherboard 702 when connected to the interconnect receptacle plug 704. The parallel orientation of the motherboard 702 and the compute card 706 permits the host system 700 to have a thinner and/or more discreet form factor design, which may improve the aesthetic appearance of the host system 700 and in particular AIO type host systems. The host system 700 may include parallel guide rails 722 defining a guide path 724 for engaging edges of the compute card 706 to guide the compute card 706 into engagement with the interconnect receptacle plug 704. In an example, the guide path 724 may have a linear guide portion 726 aligned with the interconnect receptacle plug 704 and an angled guide portion 728 for guiding the edges of the compute card 706 and the corresponding connector 712 into the linear guide portion 726. The guide path 724 provides for alignment of the compute card 706 while being inserted into the host system 700 and mated to the receptacle plug 704.

In an example, the compute card 706 may also include a computing integrated circuit ("IC") or other components (not shown) for operating the interface connectors 708 and operating external devices connected to the interface connectors 708. A heat sink 718 may be positioned on the compute card 706 over the computing IC or other components to dissipate generated heat. In an example, the compute card 706 may comprise different form factor sizes (e.g. small or large) to provide computing scalability for the host devices to correspond to different computing and feature requirements of the host system 700.

As depicted in FIGS. 7-11, the heat sink 718 may comprise a low-profile design having a cross-sectional area sized to correspond to the dimensions of the I/O panel 714. In particular, the z-height of the heat sink may be constrained to be no taller than the height of the I/O panel 714. This design configuration takes up no more vertical space on the interior of the host system 700 than the exterior I/O panel 714 occupies on the face of the outer housing 716.

The heat sink 718 may include a plurality of heat dissipation fins 730 conductively connected to a primary fin plate 732. The primary fin plate 732 defines the overall lateral area of the heat sink 718. The primary fin plate 732 may be conductively connected to the computing IC to receive the heat generated by the computing IC and dissipate the heat over the lateral area. The heat dissipation fins 730 extend transversely from the primary fin plate 732 to receive the heat from the primary fin plate 732 and dissipate the heat vertically. The plurality of fins 730 define an overall height H1 of the compute card 706 extending from the bottom of the compute card 706 to the tips of the heat dissipation fins 730.

Figure 12A:
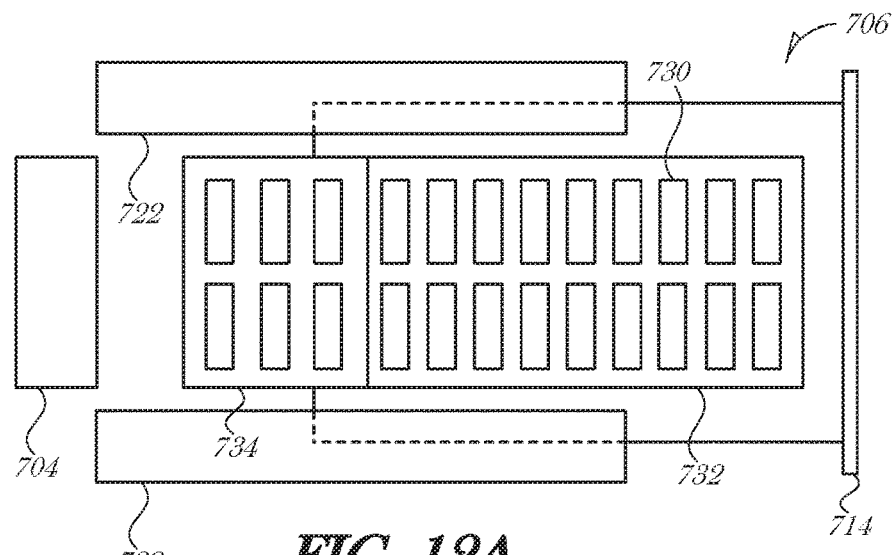
FIG. 12A is a schematic top view illustrating insertion of a compute card depicted in FIG. 8 into a receptacle of a host system, according to an embodiment.
Figure 12B:
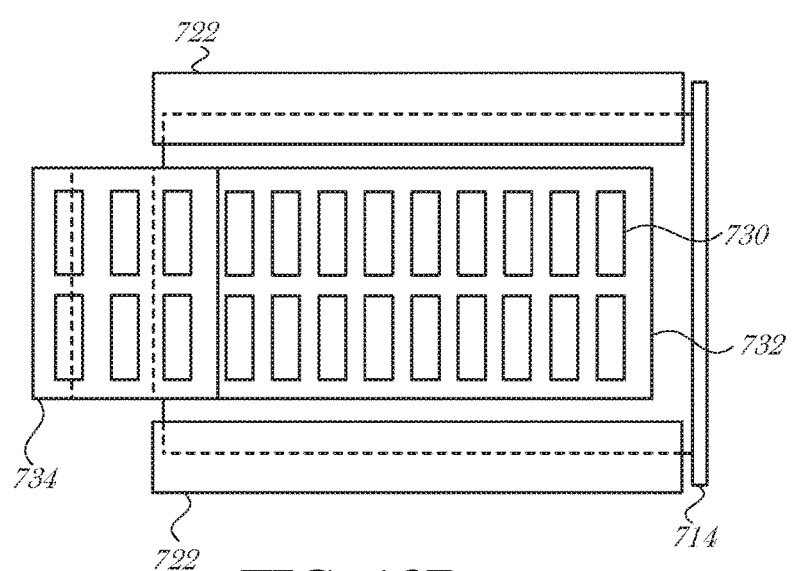
FIG. 12B is a schematic top view illustrating the compute card depicted in FIG. 12A received in the receptacle of the host system, according to an embodiment.
Figure 12C:
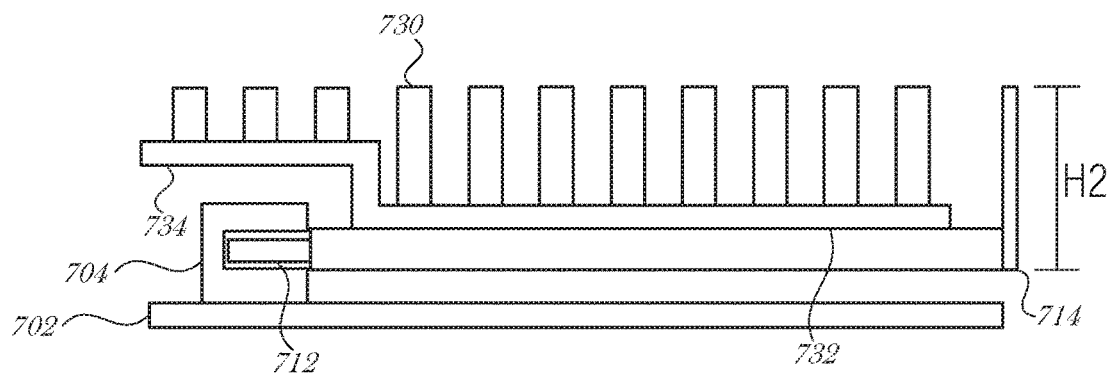
FIG. 12C is a schematic side view illustrating the compute card depicted in FIG. 12A received in the receptacle of the host system, according to an embodiment.

As depicted in FIGS. 12A-C, the heat sink 718 may further include a secondary fin plate 734, wherein a portion of the plurality of heat dissipation fins 730 are disposed on the secondary fin plate 734. The secondary fin plate 734 may be positioned offset laterally from the primary fin plate 732 to increase the overall lateral area of the heat sink 718. The increased lateral area may also provide additional surface area for dissipating heat. In this configuration, the increased overall lateral area permits the number of heat dissipation fins 730 to be increased, which may improve the overall heat dissipation of the heat sink 718. The plurality of fins 730 on the primary fin plate 732 and the secondary fin plate 734 define an overall height H2 of the compute card 706 extending from the bottom of the compute card 706 to the tips of the heat dissipation fins 730. In this configuration, the heat dissipation fins 730 may be shortened, which reduces the effective heat dissipation of fins 730. The reduced heat dissipation from the shortened heat dissipation fins 730 is offset from the increased heat dissipation provided by the increased overall lateral area and increased number of heat dissipation fins 730.

In an example, the secondary fin plate 734 may be positioned offset vertically from the primary fin plate 732 such that the secondary fin plate 734 extends over other components of the compute card 706 (e.g. the motherboard 702 and interconnect receptacle plug 704). As illustrated in FIG. 12C, in at least one example, the secondary fin plate 734 may be positioned over the motherboard 702 such that the secondary fin plate 734 is positioned over the interconnect receptacle plug 704 when the compute card 706 is coupled to the interconnect receptacle plug 704.

Figure 13A:
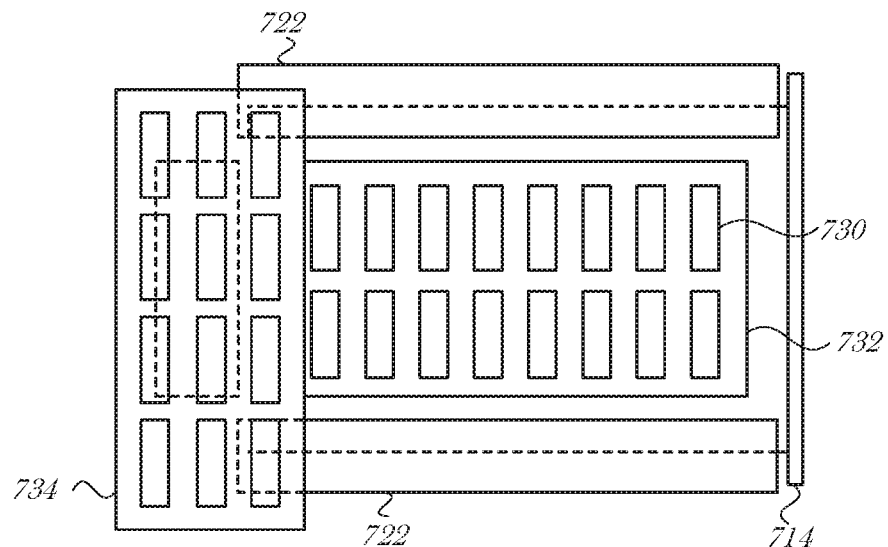
FIG. 13A is a schematic top view illustrating a compute card received in the receptacle of the host system, according to an embodiment.
Figure 13B:
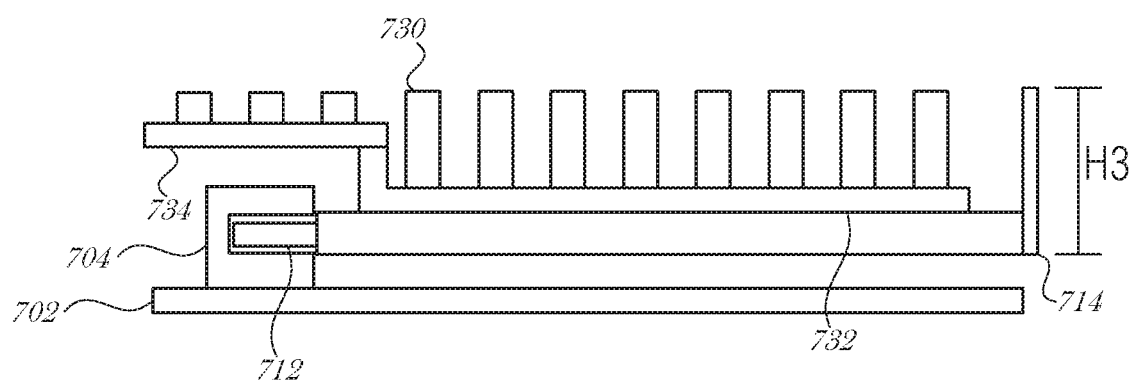
FIG. 13B is a schematic side view illustrating the compute card depicted in FIG. 13A received in the receptacle of the host system, according to an embodiment.

FIGS. 13A-B illustrate another configuration of the secondary fin plate 734, according to an embodiment. The secondary fin plate 734 may be extended longitudinally in addition to, or in the alternative of, the secondary fin plate 734 being extended laterally. In the configuration illustrated in FIGS. 13A-B, the secondary fin plate 734 is extended both laterally and longitudinally so that the secondary fin plate 734 is positioned over the interconnect receptacle plug 704 on the motherboard 702, and positioned over at least one of the guide rails 722. Depending on the internal configuration of adjacent components on the motherboard 702 or in the interior space of the housing 716 of the host system 700, the secondary fin plate 734 may be shaped to maximize the area useable for a heat sink 718, while avoiding contact with nearby components or blocking airflow for thermal control. For instance, in the example illustrated in FIG. 13A, the size of the secondary fin plate 734 is asymmetrical with respect to the longitudinal axis of the compute card 706. Other shapes and arrangements of the secondary fin plate 734 are considered to be within the scope of this disclosure.

The plurality of fins 730 on the primary fin plate 732 and the secondary fin plate 734 define an overall height H3 of the compute card 706 extending from the bottom of the compute card 706 to the tips of the heat dissipation fins 730. In this configuration, the heat dissipation fins 730 may be further shortened in comparison to H2. The shorter dissipation fins 730 reduce the effective heat dissipation of fins 730. However, the reduced heat dissipation from the shortened heat dissipation fins 730 is offset from the increased heat dissipation provided by the increased overall lateral and longitudinal area and increased number of heat dissipation fins 730, as illustrated in FIG. 13A. This ultra-low profile heat sink may provide a thinner overall housing 716 and more design options for the host system 700.

Additional Notes & Examples:

Example 1 is a system or configuring a pluggable computing device to be compatible with a pluggable host system, the system comprising: a processor subsystem; and memory including instructions, which when executed by the processor subsystem, cause the processor subsystem to: use a default communication channel to obtain a set of platform parameters from the pluggable host system, when the pluggable computer device is plugged into the pluggable host system; determine a location of a set of configuration settings from the platform parameters; access the set of configuration settings from the location; and configure a programmable logic device using the configuration settings, the programmable logic device integrated into the pluggable computing device.

In Example 2, the subject matter of Example 1 optionally includes wherein the location of the set of configuration settings is a memory device in the pluggable host system.

In Example 3, the subject matter of any one or more of Examples 1-2 optionally include wherein the location of the set of configuration settings is a memory device in the pluggable computing device.

In Example 4, the subject matter of any one or more of Examples 1-3 optionally include wherein the location of the set of configuration settings is a networked storage device.

In Example 5, the subject matter of any one or more of Examples 1-4 optionally include wherein to configure the programmable logic device, the processor subsystem is to: configure input/output pins of the programmable logic device to match input/output types and pin mappings of the pluggable computer device with the input/output types and pin mappings of the pluggable host system.

In Example 6, the subject matter of any one or more of Examples 1-5 optionally include wherein to configure the programmable logic device, the processor subsystem is to: configure subsets of programmable logic gates of the programmable logic device to perform a hardware acceleration function.

Example 7 is a method for configuring a pluggable computing device to be compatible with a pluggable host system, the method comprising: using a default communication channel to obtain a set of platform parameters from the pluggable host system, when the pluggable computer device is plugged into the pluggable host system; determining a location of a set of configuration settings from the platform parameters; accessing the set of configuration settings from the location; and configuring a programmable logic device using the configuration settings, the programmable logic device integrated into the pluggable computing device.

In Example 8, the subject matter of Example 7 optionally includes wherein the location of the set of configuration settings is a memory device in the pluggable host system.

In Example 9, the subject matter of any one or more of Examples 7-8 optionally include wherein the location of the set of configuration settings is a memory device in the pluggable computing device.

In Example 10, the subject matter of any one or more of Examples 7-9 optionally include wherein the location of the set of configuration settings is a networked storage device.

In Example 11, the subject matter of any one or more of Examples 7-10 optionally include wherein configuring the programmable logic device comprises: configuring input/output pins of the programmable logic device to match input/output types and pin mappings of the pluggable computer device with the input/output types and pin mappings of the pluggable host system.

In Example 12, the subject matter of any one or more of Examples 7-11 optionally include wherein configuring the programmable logic device comprises: configuring subsets of programmable logic gates of the programmable logic device to perform a hardware acceleration function.

Example 13 is at least one machine-readable medium including instructions, which when executed by a machine, cause the machine to perform operations of any of the methods of Examples 7-12.

Example 14 is an apparatus comprising means for performing any of the methods of Examples 7-12.

Example 15 is an apparatus for configuring a pluggable computing device to be compatible with a pluggable host system, the apparatus comprising: means for using a default communication channel to obtain a set of platform parameters from the pluggable host system, when the pluggable computer device is plugged into the pluggable host system; means for determining a location of a set of configuration settings from the platform parameters; means for accessing the set of configuration settings from the location; and means for configuring a programmable logic device using the configuration settings, the programmable logic device integrated into the pluggable computing device.

In Example 16, the subject matter of Example 15 optionally includes wherein the location of the set of configuration settings is a memory device in the pluggable host system.

In Example 17, the subject matter of any one or more of Examples 15-16 optionally include wherein the location of the set of configuration settings is a memory device in the pluggable computing device.

In Example 18, the subject matter of any one or more of Examples 15-17 optionally include wherein the location of the set of configuration settings is a networked storage device.

In Example 19, the subject matter of any one or more of Examples 15-18 optionally include wherein the means for configuring the programmable logic device comprise: means for configuring input/output pins of the programmable logic device to match input/output types and pin mappings of the pluggable computer device with the input/output types and pin mappings of the pluggable host system.

In Example 20, the subject matter of any one or more of Examples 15-19 optionally include wherein the means for configuring the programmable logic device comprise: means for configuring subsets of programmable logic gates of the programmable logic device to perform a hardware acceleration function.

Example 21 is at least one machine-readable medium including instructions for configuring a pluggable computing device to be compatible with a pluggable host system, which when executed by a processor subsystem, cause the processor subsystem to: use a default communication channel to obtain a set of platform parameters from the pluggable host system, when the pluggable computer device is plugged into the pluggable host system; determine a location of a set of configuration settings from the platform parameters; access the set of configuration settings from the location; and configure a programmable logic device using the configuration settings, the programmable logic device integrated into the pluggable computing device.

In Example 22, the subject matter of Example 21 optionally includes wherein the location of the set of configuration settings is a memory device in the pluggable host system.

In Example 23, the subject matter of any one or more of Examples 21-22 optionally include wherein the location of the set of configuration settings is a memory device in the pluggable computing device.

In Example 24, the subject matter of any one or more of Examples 21-23 optionally include wherein the location of the set of configuration settings is a networked storage device.

In Example 25, the subject matter of any one or more of Examples 21-24 optionally include wherein the instructions to configure the programmable logic device comprise instructions to: configure input/output pins of the programmable logic device to match input/output types and pin mappings of the pluggable computer device with the input/output types and pin mappings of the pluggable host system.

In Example 26, the subject matter of any one or more of Examples 21-25 optionally include wherein the instructions to configure the programmable logic device comprise instructions to: configure subsets of programmable logic gates of the programmable logic device to perform a hardware acceleration function.

Example 27 is a system for implementing a chain of trust for a composite pluggable system, the system comprising: a processor subsystem; and memory including instructions, which when executed by the processor subsystem, cause the processor subsystem to: initiate a secure boot process at a pluggable computing device; access a set of platform parameters, an original equipment manufacturer (OEM) certificate, and a signature from a pluggable host system, the pluggable host system being coupled to the pluggable computing device and together forming the composite pluggable system; verify the authenticity of the OEM certificate; verify the platform parameters; store the platform parameters, the OEM certificate, and the signature at the pluggable computing device when the authenticity of the OEM certificate and the platform parameters are verified; and use the platform parameters in a subsequent boot process or chain of trust processing of the composite pluggable system.

In Example 28, the subject matter of Example 27 optionally includes wherein initiating the secure boot measure process is in response to a reset event or a power on event.

In Example 29, the subject matter of any one or more of Examples 27-28 optionally include wherein initiating the secure boot measure process is in response to receiving a remote attestation request.

In Example 30, the subject matter of any one or more of Examples 27-29 optionally include wherein to store the platform parameters, the processor subsystem is to store the platform parameters at a non-volatile memory at the pluggable computing device.

In Example 31, the subject matter of any one or more of Examples 27-30 optionally include wherein to store the OEM certificate and the signature, the processor subsystem is to store the OEM certificate and the signature at the pluggable computing device in a trusted platform management module.

In Example 32, the subject matter of any one or more of Examples 27-31 optionally include wherein to verify the platform parameters, the processor subsystem is to use an OEM public code verification key to verify the platform parameters.

Example 33 is a method for implementing a chain of trust for a composite pluggable system, the method comprising: initiating a secure boot process at a pluggable computing device; accessing a set of platform parameters, an original equipment manufacturer (OEM) certificate, and a signature from a pluggable host system, the pluggable host system being coupled to the pluggable computing device and together forming the composite pluggable system; verifying the authenticity of the OEM certificate; verifying the platform parameters; storing the platform parameters, the OEM certificate, and the signature at the pluggable computing device when the authenticity of the OEM certificate and the platform parameters are verified; and using the platform parameters in a subsequent boot process or chain of trust processing of the composite pluggable system.

In Example 34, the subject matter of Example 33 optionally includes wherein initiating the secure boot measure process is in response to a reset event or a power on event.

In Example 35, the subject matter of any one or more of Examples 33-34 optionally include wherein initiating the secure boot measure process is in response to receiving a remote attestation request.

In Example 36, the subject matter of any one or more of Examples 33-35 optionally include wherein storing the platform parameters comprises storing the platform parameters at a non-volatile memory at the pluggable computing device.

In Example 37, the subject matter of any one or more of Examples 33-36 optionally include wherein storing the OEM certificate and the signature comprises storing the OEM certificate and the signature at the pluggable computing device in a trusted platform management module.

In Example 38, the subject matter of any one or more of Examples 33-37 optionally include wherein verifying the platform parameters comprises using an OEM public code verification key to verify the platform parameters.

Example 39 is at least one machine-readable medium including instructions, which when executed by a machine, cause the machine to perform operations of any of the methods of Examples 33-38.

Example 40 is an apparatus comprising means for performing any of the methods of Examples 33-38.

Example 41 is an apparatus for implementing a chain of trust for a composite pluggable system, the apparatus comprising: means for initiating a secure boot process at a pluggable computing device; means for accessing a set of platform parameters, an original equipment manufacturer (OEM) certificate, and a signature from a pluggable host system, the pluggable host system being coupled to the pluggable computing device and together forming the composite pluggable system; means for verifying the authenticity of the OEM certificate; means for verifying the platform parameters; means for storing the platform parameters, the OEM certificate, and the signature at the pluggable computing device when the authenticity of the OEM certificate and the platform parameters are verified; and means for using the platform parameters in a subsequent boot process or chain of trust processing of the composite pluggable system.

In Example 42, the subject matter of Example 41 optionally includes wherein initiating the secure boot measure process is in response to a reset event or a power on event.

In Example 43, the subject matter of any one or more of Examples 41-42 optionally include wherein initiating the secure boot measure process is in response to receiving a remote attestation request.

In Example 44, the subject matter of any one or more of Examples 41-43 optionally include wherein the means for storing the platform parameters comprise means for storing the platform parameters at a non-volatile memory at the pluggable computing device.

In Example 45, the subject matter of any one or more of Examples 41-44 optionally include wherein the means for storing the OEM certificate and the signature comprise means for storing the OEM certificate and the signature at the pluggable computing device in a trusted platform management module.

In Example 46, the subject matter of any one or more of Examples 41-45 optionally include wherein the means for verifying the platform parameters comprise means for using art OEM public code verification key to verify the platform parameters.

Example 47 is at least one machine-readable medium including instructions for implementing a chain of trust for a composite pluggable system, which when executed by a processor subsystem, cause the processor subsystem to:

initiate a secure boot process at a pluggable computing device; access a set of platform parameters, an original equipment manufacturer (OEM) certificate, and a signature from a pluggable host system, the pluggable host system being coupled to the pluggable computing device and together forming the composite pluggable system; verify the authenticity of the OEM certificate; verify the platform parameters; store the platform parameters, the OEM certificate, and the signature at the pluggable computing device when the authenticity of the OEM certificate and the platform parameters are verified; and use the platform parameters in a subsequent hoot process or chain of trust processing of the composite pluggable system.

In Example 48, the subject matter of Example 47 optionally includes wherein initiating the secure boot measure process is in response to a reset event or a power on event.

In Example 49, the subject matter of any one or more of Examples 47-48 optionally include wherein initiating the secure boot measure process is in response to receiving a remote attestation request.

In Example 50, the subject matter of any one or more of Examples 47-49 optionally include wherein the instructions to store the platform parameters comprise instructions to store the platform parameters at a non-volatile memory at the pluggable computing device.

In Example 51, the subject matter of any one or more of Examples 47-50 optionally include wherein the instructions to store the OEM certificate and the signature comprise instructions to store the OEM certificate and the signature at the pluggable computing device in a trusted platform management module.

In Example 52, the subject matter of any one or more of Examples 47-51 optionally include wherein the instructions to verify the platform parameters comprise instructions to use an OEM public code verification key to verify the platform parameters.

Example 53 is a host system, comprising: a motherboard having a right angled receptacle plug; and a compute card having a motherboard connector, a primary fin plate, a secondary fin plate, and a plurality of heat dissipation fins disposed on the primary and secondary fin plates, wherein the compute card is removably coupled to the right angled receptacle plug to orient the compute card parallel to the motherboard, and wherein the secondary fin plate is disposed over the right angled receptacle plug when the compute card is coupled to the motherboard.

In Example 54, the subject matter of Example 53 optionally includes wherein the host system comprises at least one guide rail defining a guide path aligned with the right angled receptacle plug; and wherein the guide rail is engagable to the compute card to guide insertion of the compute card into engagement with the motherboard connector.

In Example 55, the subject matter of Example 54 optionally includes wherein the secondary fin plate is disposed over the at least one guide rail when the compute card is coupled to the motherboard.

In Example 56, the subject matter of any one or more of Examples 53-55 optionally include wherein the motherboard connector is a Peripheral Component Interconnect Express (PCIe) connector.

In Example 57, the subject matter of any one or more of Examples 53-56 optionally include wherein the compute card includes an I/O panel positioned on the compute card opposite the motherboard connector.

In Example 58, the subject matter of Example 57 optionally includes wherein the I/O panel interfaces with an outer housing of the host system when coupled to the motherboard of the host system.

In Example 59, the subject matter of Example 58 optionally includes wherein the outer housing conceals the compute card such that only the I/O panel is exposed when the compute card is coupled to the right angled receptacle plug.

Example 60 is a method for providing a host system, comprising: providing a motherboard having a right angled receptacle plug; and providing a compute card having a motherboard connector, a primary fin plate, a secondary fin plate, and a plurality of heat dissipation fins disposed on the primary and secondary fin plates, wherein the compute card is removably coupled to the right angled receptacle plug to orient the compute card parallel to the motherboard, and wherein the secondary fin plate is disposed over the right angled receptacle plug when the compute card is coupled to the motherboard.

In Example 61, the subject matter of Example 60 optionally includes wherein the host system comprises at least one guide rail defining a guide path aligned with the right angled receptacle plug; and wherein the guide rail is engagable to the compute card to guide insertion of the compute card into engagement with the motherboard connector.

In Example 62, the subject matter of Example 61 optionally includes wherein the secondary fin plate is disposed over the at least one guide rail when the compute card is coupled to the motherboard.

In Example 63, the subject matter of any one or more of Examples 60-62 optionally include wherein the motherboard connector is a Peripheral Component Interconnect Express (PCIe) connector.

In Example 64, the subject matter of any one or more of Examples 60-63 optionally include wherein the compute card includes an I/O panel positioned on the compute card opposite the motherboard connector.

In Example 65, the subject matter of Example 64 optionally includes wherein the I/O panel interfaces with an outer housing of the host system when coupled to the motherboard of the host system.

In Example 66, the subject matter of Example 65 optionally includes wherein the outer housing conceals the compute card such that only the I/O panel is exposed when the compute card is coupled to the right angled receptacle plug.

Example 67 is at least one machine-readable medium including instructions, which when executed by a machine, cause the machine to perform operations of any of the operations of Examples 1-66.

Example 68 is an apparatus comprising means for performing any of the operations of Examples 1-66.

Example 69 is a system to perform the operations of any of the Examples 1-66.

Example 70 is a method to perform the operations of any of the Examples 1-66.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A pluggable computing device for implementing a chain of trust, the pluggable computing device comprising:
   a processor subsystem; and
   memory including instructions, which when executed by the processor subsystem, cause the processor subsystem to:
      initiate a secure boot process at the pluggable computing device;
      access, from a pluggable host system: (1) a set of original equipment manufacturer (OEM)-defined platform parameters, (2) an OEM certificate from the OEM that provided the OEM-defined platform parameters, and (3) a signature from the pluggable host system, the pluggable host system being coupled to the pluggable computing device and together forming a pluggable system, the set of OEM-defined platform parameters signed by the OEM certificate and used by the pluggable computing device to reconfigure itself;
      verify, at the pluggable computing device, the authenticity of the OEM certificate;
      verify, at the pluggable computing device, the OEM-defined platform parameters;
      store, at the pluggable computing device, the OEM-defined platform parameters, the OEM certificate, and the signature at the pluggable computing device when the authenticity of the OEM certificate and the OEM-defined platform parameters are verified; and
      use, at the pluggable computing device, the OEM-defined platform parameters in a subsequent boot process or chain of trust processing of the pluggable system.

2. The pluggable computing device of claim 1, wherein initiating the secure boot measure process is in response to a reset event or a power on event.

3. The pluggable computing device of claim 1, wherein initiating the secure boot measure process is in response to receiving a remote attestation request.

4. The pluggable computing device of claim 1, wherein to store the OEM defined platform parameters, the processor subsystem is to store the OEM defined platform parameters at a non-volatile memory at the pluggable computing device.

5. The pluggable computing device of claim 1, wherein to store the OEM certificate and the signature, the processor subsystem is to store the OEM certificate and the signature at the pluggable computing device in a trusted platform management module.

6. The pluggable computing device of claim 1, wherein to verify the OEM-defined platform parameters, the processor subsystem is to use an OEM public code verification key to verify the OEM-defined platform parameters.

7. The pluggable computing device of claim 1, wherein the OEM-defined platform parameters include input/output (I/O) types supported by the pluggable host system.

8. The pluggable computing device of claim 1, wherein the OEM-defined platform parameters include input/output (I/O) pin mappings to use with the pluggable host system.

9. The pluggable computing device of claim 1, wherein the OEM-defined platform parameters include hardware accelerator functions to use with the pluggable host system.

10. The pluggable computing device of claim 1, wherein the OEM-defined platform parameters include a pointer to a programmable logic device configuration file for use when reconfiguring the pluggable computing device.

11. A method for implementing a chain of trust for a pluggable computing device, the method performed by the pluggable computing device, the method comprising:
    initiating a secure boot process at the pluggable computing device;
    accessing, by the pluggable computing device from a pluggable host system: (1) a set of original equipment manufacturer (OEM)-defined platform parameters, (2) OEM certificate from the OEM that provided the OEM-defined platform parameters, and (3) a signature from the pluggable host system, the pluggable host system being coupled to the pluggable computing device and together forming a pluggable system, the set of OEM-defined platform parameters signed by the OEM certificate and used by the pluggable computing device to reconfigure itself;
    verifying, at the pluggable computing device, the authenticity of the OEM certificate;
    verifying at the pluggable computing device, the OEM-defined platform parameters;

storing, at the pluggable computing device, the OEM-defined platform parameters, the OEM certificate, and the signature at the pluggable computing device when the authenticity of the OEM certificate and the OEM defined platform parameters are verified; and using, at the pluggable computing device, the OEM-defined platform parameters in a subsequent boot process or chain of trust processing of the pluggable system.

12. The method of claim 11, wherein initiating the secure boot measure process is in response to a reset event or a power on event.

* * * * *

UNITED STATES PATENT AND TRADEMARK OFFICE
CERTIFICATE OF CORRECTION

PATENT NO. : 10,545,770 B2
APPLICATION NO. : 15/582041
DATED : January 28, 2020
INVENTOR(S) : Chew et al.

Page 1 of 1

It is certified that error appears in the above-identified patent and that said Letters Patent is hereby corrected as shown below:

In the Claims

In Column 22, Line 55, in Claim 11, after "(2)", insert --an--

In Column 22, Line 66, in Claim 11, after "verifying", insert --,--

Signed and Sealed this
Fourteenth Day of July, 2020

Andrei Iancu
*Director of the United States Patent and Trademark Office*